United States Patent Office 3,268,503
Patented August 23, 1966

3,268,503
METHOD OF PREPARING EDIBLE SOYBEAN CHARACTERIZED BY GREATLY ENHANCED WATER ABSORPTION
Gus C. Mustakas and Edward L. Griffin, Jr., Peoria, Ill., assignors to the United States of America as represented by the Secretary of Agriculture
No Drawing. Filed Apr. 23, 1962, Ser. No. 189,646
6 Claims. (Cl. 260—123.5)

A nonexclusive, irrevocable, royalty-free license in the invention herein described, throughout the world for all purposes of the United States Government, with the power to grant sublicenses for such purposes, is hereby granted to the Government of the United States of America.

This invention relates to a continuous process for preparing an edible, debittered soybean protein product characterized by its ability to absorb about 3.5 to about 4 times its weight of water despite the presence of extensive to substantially complete denaturation.

Our present process comprises a modification of the flash desolventization process of our U.S. Patent No. 3,023,107, in which we teach that a bland, substantially undenatured and highly water soluble soybean protein product may be obtained from defatted soybean flakes by countercurrently extracting the flakes with 1.5 parts by weight of an aqueous lower alcohol solvent such as 95-percent methanol or 91-percent isopropanol, draining off the solvent, fluidizing the drained flakes for 2 to 5 seconds in a carbon dioxide-containing recycled vapor stream at about 150° C. to flash desolventize the flakes, and cooling the flakes in a stream of air.

Prior to the discoveries constituting our present invention, debittered highly denatured soybean proteins have not been employed as extenders in baked goods such as bread, especially meat products such as bologna and frankfurters, in milk products, or in baby foods because these prior art highly denatured, essentially water-insoluble soybean proteins have relatively poor water absorption capacities and are, therefore, incapable of binding the large amounts of water required in the above commercial foodstuffs.

The substantially undenatured largely water soluble soybean protein prepared by the process of U.S. Pat. No. 3,023,107 is somewhat satisfactory as an extender in the above types of foodstuffs, but it is too water-soluble to provide maximum bulk. Also the need for higher concentrations of the alcohols makes it more expensive to prepare than the more highly denatured and insoluble soybean protein products such as are described in the instant invention.

A primary object of our invention is the preparation from hexane-defatted soybean flakes of debittered, bland, essentially denatured and substantially water-insoluble food grade protein having an unexpectedly improved water-absorbing capacity.

Another and more specific object is the preparation of a debittered highly insoluble food-grade soybean protein that is capable of absorbing about 3.5–4 times its weight of water so as to make it useful as a superior extender in specialty meats, bread, baby foods, gelatin-type desserts, milk products, etc.

Still another object is a continuous process which employs considerably more dilute alcohols and as well as higher temperatures and increased fluidization times than those employed in U.S. Pat. No. 3,023,107 to produce substantially denatured soybean protein having a water absorption capacity at 88° C. of about 350–400 ml. per 100 gms. of the novel protein product.

Another object is a vegetable protein conversion process which employs the less costly more dilute alcohols that necessitate higher desolventizing temperatures without excessively degrading the protein by prolonged contact with hot metal surfaces and without causing scorching, moisture balling, loss of bulkiness, and poor water absorption.

Another object is the high water-binding capacity protein produced by our novel process.

Other objects and advantages will become apparent to those skilled in the art in the course of the following detailed description of the invention.

In accordance with the stated objects of our invention we have now discovered that previously defatted aqueous alcohol-moist soybean flakes that have been drained following slurrying in a 50–70 percent solution of methanol, ethanol, or isopropanol in water to remove the bitter factors and the extensive amount of soluble carbohydrate material may be freed of their absorbed aqueous alcohol without inducing degradation and other adverse processing side effects such as balling-up, scorching, and poor moisture absorbing ability apparently resulting from the joint action of the large amount of water and the high temperature required for volatilizing the latter, by fluidizing the damp flakes in a suitable desolventizer for 7–9 seconds at about 370°–375° F. (about 190° C.) to obtain soybean flakes that will absorb about 3.5–4 times their own weight of water at 80° C.

The critical desolventization phase of our process is conducted at about 190° C. in an indirectly heated desolventizer resembling that of Brekke et al., Jour. Am. Oil Chemists' Soc. 36, 256 (1959) excepting for the insertion of an inverted U-section in the horizontal duct which adds four elbows, thus functionally practically doubling the overall length of the steam-jacketed desolventizing duct so that the blower-induced critical fluidization time of the aqueous alcohol-wet soybean flakes prior to their discharge at a conventional cyclone separator is 7–9 seconds. Whereas 100 gms. of the original defatted soybean flakes absorbed only 250 ml. of water at 80° C. and had a bulk density of 55 lbs./cu. ft., 100 gms. of the product obtained by the instant process absorbed about 350–400 ml. of water under the same conditions and had a bulky density of about 46 lbs./cu. ft. When flakes drained from 70 percent aqueous ethanol were slowly desolventized in a heated vessel comprising internal agitation means, the resulting soybean flakes were partly caked and scorched. They had a bulk density of 64 lbs./cu. ft. and 100 gms. absorbed only 275 ml. of water at 80° C.

A fuller understanding of our invention will be had by reference to the following examples, which are given only by way of illustration and are in no way intended to limit the scope of the invention.

*Example 1*

Defatted soybean flakes were slurried in 50 percent methanol at room temperature for 30 minutes. The drained wet marc containing about 31.8 percent moisture was introduced at the rate of 10 lb./hr. into the 61 ft./sec. velocity recycle vapor stream of an inverted U tube-containing closed system flash desolventizer, said recycle vapor stream comprising air, moisture, methanol, and diluent carbon dioxide being heated by indirect steam at 255 p.s.i. pressure at a temperature of 373° F. After an average residence time of 9 seconds in the desolventizer tube, the essentially dry flakes were removed from the vapor stream by a cyclone separator and cooled in a stream of air. One hundred grams of the thusly treated soybeans were found to absorb 368 ml. of water at 80° C. The bland flakes assayed 74.2 percent protein and had a nitrogen solubility index (water soluble protein ÷ total protein × 100) of 4.1 percent.

*Example 2*

Defatted soybean flakes were slurried in 70 percent methanol at room temperature for 30 minutes. The drained wet marc containing 18.8 percent moisture and 28.2 percent methanol was fluidized by introduction at the rate of 20 lb./hr. into a 69 ft./sec. velocity recycle stream of an inverted U-containing closed system flash desolventizer, said vapor stream comprising air, moisture, methanol, and diluent carbon dioxide, being heated by indirect steam to a temperature of 376° F. After an average residence time of 8 seconds in the desolventizer tube, the flakes were removed from the vapor stream by a cyclone separator and cooled in a stream of cool air. The bland, free-flowing product absorbed 3.84 times its weight of water at 80° C.; it had a protein content of 74.1 percent and a nitrogen solubility index of 4.8 percent.

*Example 3*

Defatted soybean flakes were slurried in 50 percent ethanol at room temperature for 30 minutes. The drained wet marc containing 32.6 percent moisture and 16.9 percent ethanol was introduced at the rate of 10 lbs./hr. into the resolventization apparatus of Example 1 excepting that the recycle vapor stream was indirectly heated to 376° F. and had a velocity of 72.4 ft./sec. After a residence time of 7 seconds, the cyclone-recovered air-cooled flakes having a nitrogen solubility index of 5.07 and a protein content of 77.0 percent were found to absorb 3.68 times their weight of water at 80° C.

*Example 4*

Defatted soybean flakes were slurried in 50 percent aqueous isopropanol at room temperature for 30 minutes. The drained wet marc containing 35.6 percent moisture and 21.5 percent isopropanol was introduced at the rate of 20 lbs./hr. into the desolventization apparatus of Example 1 excepting that the recycle vapor stream was indirectly heated to 380.2° F. and the stream had a velocity of 68.4 ft./sec. After a residence time of 8 seconds, the cyclone-recovered air-cooled flakes having a nitrogen solubility index of 4.96 and a protein content of 72.3 percent were found to absorb 3.48 times their weight of water at 80° C.

*Example 5*

Defatted soybean flakes were slurried in 70 percent isopropanol at room temperature for 30 minutes. The drained wet marc containing 21.2 percent moisture and 27.2 percent isopropanol was introduced at a rate of 20 lbs./hr. into the desolventization apparatus of Example 1 excepting that the recycle vapor stream was indirectly heated to 378° F. and the stream had a velocity of 67 ft./sec. After a residence time of 8 seconds, the cyclone-recovered air-cooled flakes having a nitrogen solubility index of 4.6 and a protein content of 71.8 percent were found to absorb 3.43 times their weight of water at 80° C.

We claim:

1. Method of preparing essentially denatured edible soybean protein capable of absorbing about 3.5 to 4 times its weight of water at 80° C. comprising the steps of slurrying defatted soybean flakes at room temperature in a 50–70 percent aqueous solution of an alcohol selected from the group consisting of methanol, ethanol, and isopropanol, draining the alcohol from the flakes to provide a wet marc containing about 19% to about 36% of moisture and about 17% to about 28% of said alcohol, fluidizing and desolventizing the marc for 7–9 seconds at about 370° F. to 375° F. in an indirectly heated recycle vapor stream containing air, moisture, said alcohol, and diluent carbon dioxide, said stream having a velocity of about 60–75 ft. per second, recovering the fluidized flakes, and cooling them in a stream of air.

2. The method of claim 1 wherein the aqueous solution comprises 50 percent methanol, and the fluidizing and desolventizing time is 9 seconds.

3. The method of claim 1 wherein the aqueous solution comprises 70 percent methanol, and the fluidizing and desolventizing time is 8 seconds.

4. The method of claim 1 wherein the aqueous solution comprises 50 percent ethanol, and the fluidizing and resolventizing time is 7 seconds.

5. The method of claim 1 wherein the aqueous solution comprises 50 percent isopropanol, and the fluidizing and desolventizing time is 8 seconds.

6. The edible soybean proteins produced by the method of claim 1.

References Cited by the Examiner

UNITED STATES PATENTS 3,023,107    2/1962    Mustakas _____ 99—98

OTHER REFERENCES

Markley: Soybeans and Soybean Products, vol. I, pp. 275–288, (1950).

SAMUEL H. BLECH, *Primary Examiner.*

LEON ZITVER, *Examiner.*

D. P. CLARKE, H. SCHAIN, *Assistant Examiners.*